United States Patent [19]

Lasher

[11] 4,123,404

[45] Oct. 31, 1978

[54] WATER-BASED COATINGS

[75] Inventor: Edward A. Lasher, Beverly Hills, Calif.

[73] Assignee: Whittaker Corporation, Los Angeles, Calif.

[21] Appl. No.: 818,789

[22] Filed: Jul. 25, 1977

Related U.S. Application Data

[60] Continuation of Ser. No. 576,914, May 12, 1975, abandoned, which is a division of Ser. No. 246,353, Apr. 21, 1972, abandoned.

[51] Int. Cl.$^2$ .............................................. C08L 61/28
[52] U.S. Cl. ........................... 260/29.4 R; 260/29.2 E; 260/850; 428/481; 428/482; 428/528; 560/89; 560/120; 560/128; 560/198
[58] Field of Search ...................... 260/29.4 R, 29.2 E, 260/485 G, 75 R, 75 M, 850; 560/89, 120, 198, 128

[56] References Cited

U.S. PATENT DOCUMENTS

| | | | |
|---|---|---|---|
| 2,915,487 | 12/1959 | Shelley | 260/29.4 R X |
| 3,000,917 | 9/1961 | Babayan | 260/485 G X |
| 3,130,200 | 4/1964 | Barbry | 260/485 G X |
| 3,135,785 | 6/1964 | Fritz | 260/485 G |
| 3,223,666 | 12/1965 | Bolton | 260/29.2 E |
| 3,224,992 | 12/1965 | Stephens | 260/75 R |
| 3,329,635 | 7/1967 | Miranda | 260/75 R |
| 3,668,277 | 6/1972 | Riemhofer et al. | 260/850 |

*Primary Examiner*—Walter C. Danison
*Attorney, Agent, or Firm*—Donald E. Nist

[57] ABSTRACT

Water-thinnable, di- or polyesters and water-insoluble coatings which are particularly suitable as wood finishes and which are made by reaction of the di- or polyesters with water-soluble aminoplast resins are described. The ester resin intermediates are made by reacting a triol having a carbon/oxygen ratio of about 5:3 to about 7:3 with a polycarboxylic acid selected from lower molecular weight polycarboxylic acids so that the resulting ester resin is water-thinnable. The ratio of triol to polycarboxylic acid is varied to produce either the diester or the polyester.

16 Claims, No Drawings

WATER-BASED COATINGS

This is a continuation of application Ser. No. 576,914, filed May 12, 1975, now abandoned, a division of application Ser. No. 246,353, filed Apr. 21, 1972, now abandoned.

BACKGROUND OF THE INVENTION

This invention relates to water-based organic coatings and more particularly, to such coatings which comprise the reaction product of a polyester resin with an aminoplast resin.

With the increasing shortage of hard woods such as walnut and oak, there is an increasing trend toward manufacturing wood grain panels by applying an organic coating with a simulated wood grain to inexpensive wood materials such as plywood and masonite. This procedure comprises applying a base coat to the, e.g., plywood panel, usually after the latter is filled; printing the desired wood grain pattern onto this base coat; and then applying a top coat to protect the wood grain pattern.

Presently-employed base and top coats are usually formed from a polyester which is reacted with an amino or similar resin. However, these coatings are produced from the aforementioned constituents using substantial amounts of solvents other than water. The amount of such solvents can be considerable. For example, as much as two tons of solvent may be employed to make one thousand gallons of coating material. Since most of this solvent is lost during production or thereafter in the drying of the coating, a considerable amount of pollution is caused by the escape of these fumes into the atmosphere. For this reason, it is desirable to substitute water for substantially all of the solvents previously employed.

In addition to it being desireable to employ heat-curable, water-based resin solutions, it is desirable to include water-soluble aminoplast resins, e.g., urea-formaldehyde resins, in such solutions since the latter cure to form hard, water-insoluble coatings. However, unless modified, the cured aminoplast resins are brittle or friable. For this reason, they are unsuitable, without modification, for applications where any flexibility is required, particularly if substantial temperature changes are also encountered.

Heretofore, polyester-modified aminoplast resin coatings have been made as disclosed for example in U.S. Pat. Nos. 3,477,976, 3,223,666 and 3,108,083. However, a disadvantage of these coatings is that the amount of polyester resin present in these coatings is substantially greater than the amount of aminoplast resin. Characteristically, weight ratios of polyester to aminoplast resin in the range of 3:1 to 10:1 are disclosed as being used. The low amounts of aminoplast resin employed means that the advantageous properties of these resins are being substantially modified together with the disadvantageous properties. That is, extent of cure and water and chemical resistance are reduced as compared to the aminoplast alone. Additionally, costs are increased because of the higher cost of the polyester resins.

SUMMARY OF THE INVENTION

This invention comprises water-thinnable ester resins and water-insoluble coatings made therefrom. The esters are diesters or polyesters made by reacting a triol (or equivalent) having a carbon/oxygen ratio of about 5:3 to about 7:3 with a polycarboxylic acid which is selected from the group of such acids having from 3 to 10 carbons so that the resulting ester is highly water-thinnable. The ratio of triol to polycarboxylic acid is varied to obtain either a diester or a polyester as desired. A water-insoluble coating is made by reacting the diester or polyester with a water-soluble, aminoplast resin.

The primary advantage obtained from the use of the herein-disclosed ester resins is that, when used in combination with water-soluble, aminoplast resins, they permit use of higher amounts of the aminoplast resin in aqueous media than was heretofore possible while sufficiently modifying the friable characteristic of the aminoplast resin so that the cured coatings made therefrom are not brittle. Furthermore, coatings having overall physical and chemical properties at least as good as prior art aminoplast coating made using organic solvents can be made while substantially reducing pollution caused by evaporation of organic solvents during curing. This is particularly significant when one considers that, as previously noted, approximately two tons of solvent may be used to make 1000 gallons of the water-insoluble coating and this amount of coating may be used up in 1 day or less on a panel coating line.

Additionally, significant cost savings are realized because of the lower cost of water as compared to organic solvents. Cost savings are further realized from the use or relatively high concentrations of the aminoplast resin since the latter, particularly the more readily available urea- and melamine- formaldehyde resins, are less expensive than the ester resins.

The coatings described herein are also characterized by rapid cure (approx. 1–2 min.) to a hardness of about 4H–6H at relatively low temperatures on the order of 150° F. to 200° F. This is extremely important because panels to be coated with these coatings are stacked while the panels are still hot immediately after being removed from the panel coating line. If cure is not substantially complete at that time, the coatings will be severely marred. The low cure temperatures are necessitated by the characteristics of the wood being coated (higher temperatures may be employed with, e.g., masonite).

DESCRIPTION OF THE PREFERRED EMBODIMENT

In general, this invention includes water-thinnable ester reins and the water-insoluble products made therefrom by reaction of the ester resins with a water-soluble, aminoplast resin in an aqueous medium.

As used herein, the term "water-thinnable" designates ester resins made as described herein which are at least soluble down to about 10–40% solids in solvent mixtures containing up to about 65% water (by weight). In general, certain of the polyesters containing the higher carbon/oxygen ratios are only water-thinnable to the aforementioned extent whereas some of the diesters with the lower carbon/oxygen ratios are soluble down to about 10% solids in water alone. Unless otherwise indicated, all percentages employed herein are percentages by weight.

The ester resin may be a di- or triester (referred to herein as "diesters") or a polyester. In either case, the ester resin is made by reacting specific triols, or their equivalents as described hereafter, with a polycarboxylic acid which is selected with respect to the triol so that the resulting ester resin is water-thinnable.

The triols useable herein are solids at normal ambient temperatures and have a carbon/oxygen ratio of about 5:3 to about 7:3. Above a ratio of about 7:3, the resulting ester resin is substantially insoluble in water-containing solvent mixtures whereas, below a carbon/oxygen ratio of about 5:3, the triol, e.g., glycerine, when used in combination with aliphatic polycarboxylic acids, makes the water-insoluble product too soft to be useful as a wood finishing coating. Examples of useful triols include trimethyolethane, trimethyolpropane and trimethylolbutane.

As previously stated, equivalents of these triols may be used. By that is meant that a combination of diols and polyols, or of polyols, may be employed provided that the aforementioned carbon/oxygen ratio range requirement is met by the combination and provided that it has an average functionality of about 3 to about 3.5. An example of such an equivalent is the combination of neopentyl glycol and pentaerythritol employed in equal molar amounts. It is to be noted that neither of these alcohols alone would produce a water-insoluble coating although for different reasons. Among other things, the functionality of the neopentyl glycol is too low to provide sufficient cross-linking with the aminoplast resin and the functionality of the pentaerythritol is so high that too many hydroxyl groups are left unreacted. The result in both cases is relatively soft, water-permeable coatings.

Hereinafter, and in the claims, the term "triol" designates a triol and any alcohol combination equivalents of the triols useable herein.

The polycarboxylic acid useable herein may be aliphatic or aromatic and saturated or unsaturated. It may also be di-, tri- or tetrafunctional although difunctional carboxylic acids are preferred since they generally react more completely with the triols used herein. The particular acid employed is one which, in combination with the particular triol and in the amounts disclosed hereafter, will produce a water-thinnable diester or polyester. To produce the diester or polyesters, the polycarboxylic acid is selected from the group of polycarboxylic acid having from 3 to about 10 carbons. Generally, if the polycarboxylic acid is unsaturated, it may also include more carbons than a saturated acid to produce water solubility with a particular triol.

Examples of useful polycarboxylic acids are: orthophthalic acid, isophthalic acid, tetrahydrophthalic acid, terephthalic acid, hexahydrophthalic acid, endomethylene tetrahydrophthalic acid, malonic acid, succinic acid, glutaric acid, adipic acid, suberic acid, azelaic acid, trimethyl adipic acid and sebacic acid. Anhydrides of these acids may also be used.

For the diesters, the ratio of triol to polycarboxylic acid is about three equivalents of triol to one of acid. That is, about two moles of triol are used with each mole of dicarboxylic acid whereas three moles of triol are used with each mole of tricarboxylic acid. Using the aforementioned equivalents ratio produces at least tetrafunctional diesters. Furthermore, the water-thinnable ester resins produced thereby have a maximum carbon/oxygen ratio of about 2.5:1.

The polyester resin is made by reacting about 1.9 to about 2.5 equivalents of triol with one equivalent of polycarboxylic acid. With this ratio of triol to acid, the water-thinnable polyesters also have a maximum carbon/oxygen ratio of about 2.5:1.

With regard to both the diesters and polyesters, if the triol proportion is substantially higher than that disclosed, there is an adverse effect on the water insolubility of the coatings. On the other hand, if the polycarboxylic acid proportion is substantially higher than that disclosed (equivalent to a lower triol proportion), there is an adverse effect on the water-thinnability of the diester and polyester resins when the reaction is carried out to obtain the low acid numbers disclosed herein.

To prepare the diester or polyester resin, the triol and polycarboxylic acid are reacted with each other under process conditions which are well known in the art. Preferably, they are reacted together in a reactor vessel equipped with a stirrer to substantially homogeneously mix the reactor contents and the reaction is preferably conducted in an inert atmosphere, e.g., carbon dioxide. The reactants are heated to a temperature of about 450° F. over a period of about 3–4 hours and held at about that temperature until the esterification is substantially complete, i.e., when substantially all of the carboxyl groups have reacted with the triol hydroxyls. This is evidenced by acid number determinations which may be made from time to time. At substantially complete reaction conditions, the acid number is less than about 10.

The diesters so formed are more thinnable by water then are the polyesters. However, the polyesters enable coatings to be made with lower solids content because of their higher inherent viscosity and they resist surface marring (blocking) at elevated temperatures better. Additionally, the cured coatings have somewhat less water-solubility when made from the polyesters as compared with those made from diesters.

In order to produce the wood finishing coatings, the diesters and polyesters are reacted with water-soluble, aminoplast resins, e.g., urea-aldehyde and melamine-aldehyde resins. Preferably, because of its availability and lower cost, urea-formaldehyde resin is employed, particularly if the panel to be coated is a wood which dictates the use of lower cure temperatures. If the panel to be coated is formed from materials, e.g., masonite or hard woods, which permit the use of relatively high cure temperatures, the diesters and polyesters may be reacted with water-soluble melaminealdehyde resins, e.g., melamine-formaldehyde resin.

The reaction between the diester or polyester and the water-soluble, aminoplast resin is carried out in solution in which the solvent is water or water is combination with e.g., isopropanol. This may be accomplished by solubilizing the ester in water or in isopropanol and thereafter adding the aminoplast resin thereto with the latter being dissolved in water or isopropanol so that the two reactants remain soluble in the resulting solvent composition.

The amount of urea-aldehyde or melamine-aldehyde resins employed is a function of the allowable cure temperature and the type of ester, i.e., whether diester or polyester. Higher allowable cure temperatures permit the use of lesser amounts of the aldehyde resin. Because of the larger molecular size of the polyester, smaller amounts of the aldehyde resin are effective in combination with the polyester as compared with urea-aldehyde resin where either can be used. In any event, the amount of the aldehyde resin employed in that which will produce a substantially water-insoluble, cured coating. By substantial water-insolubility is meant that the cured coating itself will not be significantly affected after immersion in water at ambient temperature for several days.

The diester is usually reacted with an amount of urea-aldehyde resin so that the latter constitutes about 50% to about 75% of the total weight of these two reactants. Lesser amounts of melamine-aldehyde resin may be used with the diester. For the polyester, urea-aldehyde resin percentages of about 25% to about 75% of the reactants may be used whereas, lesser amounts of melamine-aldehyde resin may be employed.

Curing of the ester-aminoplast reactants takes place at elevated temperatures and, preferably, in the presence of a catalyst such as toluene sulfonic acid (TSA). Temperatures up to about 350° F. may be used although the particular temperature employed will usually be dictated by the nature of the panel material to which the coating is to be applied. E.g., some wood panels limit the cure temperature to about 150° F. to 200° F. whereas masonite and certain hard wood panels permit use of temperatures up to about 350° F. The cure time is also usually dictated by the panel coating line and is generally on the order of 1 min. to 2 min. Even in these short times and at the lower cure temperatures, the herein-described coatings are highly cross-linked and substantially cured so as to be substantially water-impermeable and resistant to high pressures such as are present in panel stacks.

This invention will now be described further by the following Examples.

EXAMPLE 1

A number of diesters and one triester were formulated using various combinations of the triols and polycarboxylic acids disclosed herein as shown in Table 1.

The procedure employed was substantially the same in each case and was as follows. The reactants were charged to a reactor vessel in the amounts shown in Table 1. A carbon dioxide atmosphere was produced in the vessel and maintained while the reactants were heated slowly, with stirring, to a temperature of about 450° F.–470° F. over a period of about 2.5–3 hours. This temperature was then maintained for about an additional hour until the acid number on the solids in the reaction mixture was lowered to about 10 or less. Water of condensation was removed from the reactor as it formed.

After completion of the reaction, isopropanol was added to the resulting diester to provide a desired solids content. Each of these esters was water-thinnable.

TABLE 1

| Component | Resin and Amount (GM) | | | | | | | |
|---|---|---|---|---|---|---|---|---|
| | A | B | C | D | E | F | G | H |
| TMP | 1418 | | 1346 | | 1540 | | 1297 | 1531 |
| TME | | 1372 | | 1297 | | 1500 | | |
| Adipic acid | 773 | 834 | | | | | | |
| Phthalic anhydride | | | 744 | 800 | | | | |
| Maleic anhydride | | | | | 563 | 612 | | |
| Trimellitic anhydride | | | | | | | 619 | |
| Succinnic anhydride | | | | | | | | 572 |
| Solids (wt. %) | | | | | 80 | | | |
| Acid No. on Solids | 4.4 | 3.5 | 4.9 | 4.9 | 7.5 | 3.6 | 4.8 | 3 |
| Solvent | | | | | IPA | | | |

Each of the ester resins identified in Table 1 (A-H) was employed to produce a heat-curable, aqueous resin composition (I-P, respectively). Each of the latter was made using the same concentrations and components (except for the ester) as shown in Table 2. Each ester resin was used as an 80% by wt. solution in IPA. The XB-1065-25-80 is an 88% (wt.) solution of urea-formaldehyde resin in isopropanol.

TABLE 2

| Component | Resin and Amount (gm.) | | | | | | | |
|---|---|---|---|---|---|---|---|---|
| | I | J | K | L | M | N | O | P |
| Ester Resin* | A | B | C | D | E | F | G | H |
| XB-1065-25-80 | | | | 70 | | | | |
| Distilled H₂O | | | | 25 | | | | |
| 50%(wt.) TSA in water | | | | 5 | | | | |

*30 gm. of each ester resin solution were used.

The components for each of the coating compositions set forth in Table 2 were heated together at 300° F. for 10 sec. to produce a cured coating. In each case, a good cure resulted. The uncured coatings exhibited excellent flow when applied to a substrate with the flow being equivalent to that of a solvent system. In all cases, the cured coatings showed excellent water resistance after standing at room temperature for a few days.

EXAMPLE 2

This Example shows the use of a combination of organic alcohols in place of single triols employed in Example 1 to make a diester (Q) and two polyester (R and S) resins.

The ester resins were made as described in Example 1 using the components and amounts set forth in Table 3. The phosphoric acid was used to catalyze one of the reactions although it was not necessary to do so. The resins Q, R and S had a total hydroxyl functionality of about 3.1, 3.4 and 3.3, respectively.

TABLE 3

| Component | Resin and Amount (gm.) | | |
|---|---|---|---|
| | Q | R | S |
| Adipic Acid | | 915 | |
| Phthalic anhydride | | | |
| Isophthalic Acid | | | 1055 |
| Trimethyolethane | | | 900 |
| Pentaerythritol | | | |
| Dipentaerythritol | | | 210 |
| Diethylene glycol | | | |
| Neopentyl glycol | | 326 | |
| Pentek (87% mono- and 13% dipentaerythritol) | | 784 | |
| Distilled H₂O | | 22 | |
| 85% H₃PO₄ | | 2 | |
| Solids (wt. %) | 80 | 80 | 70 |
| Acid No. on solids | 5.2 | 5.7 | 8 |
| Solvents | IPA | 50% IPA / 50% H₂O | IPA |
| Water-thinnable | Yes | Yes | Yes |
| C/O ratio | — | 1.974 | 2.355 |

Each of these resins was employed to formulate a heat-curable resin solution using the components and concentrations set forth in Table 4.

TABLE 4

| Component | Resin and Amount (gm) | | |
|---|---|---|---|
| | T | U | X |
| Q | | | 30 |

TABLE 4-continued

| Component | Resin and Amount (gm) | | |
|---|---|---|---|
| | T | U | X |
| R | 30 | | |
| S | | 31.6 | |
| XB-1065-25-80 | 70 | 27.6 | 75 |
| Distilled H₂O | 25 | 15.5 | 25 |
| 50% TSA in H₂O | 5 | | 5 |
| Isopropanol | | 14.3 | |
| 50% ISA in methanol | | 5.0 | |
| Wax solution (15%) | | 6.0 | |
| 300° F/10 sec. | Good | Excellent | Good |
| Flow | | Excellent | |
| Water resistance | | Excellent | |

EXAMPLE 3

This Example illustrates the formation of polyesters using a single triol.

Polyesters were made as described in Example 1 using the components and component concentrations set forth in Table 5.

TABLE 5

| Component | Resin and Amount (gm.) | |
|---|---|---|
| | V | W |
| Isophthalic acid | 480 | 908 |
| Trimethylolethane | 1174 | 1150 |
| Maleic anhydride | 115 | 190 |
| Adipic acid | 423 | |
| Solids (wt. %) | 70 | 60 |
| Acid No. on solids | 5.8 | 8.35 |
| Solvent | IPA | 75% IPA; 25% H₂O |
| Water thinnable | Yes | Yes |
| C/O ratio | 2.24 | 2.228 |

Heat-curable resin compositions were made from these polyesters as described in Example 1 using the components and concentrations set forth in Table 6.

TABLE 6

| Component | Resin and Amount (gm.) | |
|---|---|---|
| | Y | Z |
| V | 31.6 | |
| W | | 36.8 |
| XB 1065-25-80 | 27.6 | 27.6 |
| Isopropanol | 14.3 | 11.5 |
| Distilled H₂O | 15.5 | 13.1 |
| 50% TSA in methanol | 5 | 5 |
| Wax solution (15%) | 6 | 6 |
| Cure | Excellent | |
| Water bleed thru | | " |
| Flow | | " |
| Adhesion over primer | | " |

The composition made as set forth in Table 6 was cured at 300° F. for 30 sec. with the results shown in Table 6. The water resistance of both cured resins after several days at room temperature was excellent.

I claim:

1. A method of making a heat-curable, aqueous resin solution incorporating water-thinnable ester therein for use in making a water-insoluble coating consisting of the steps of:
    admixing (1) a polyol having a hydroxyl functionality between about 3 and about 3.5 and having a carbon/oxygen ratio between about 5:3 and about 7:3 with (2) a polycarboxylic acid having from 3 to about 10 carbon atoms and having 2 to 4 carboxyl groups in an equivalents ratio of said polyol to said polycarboxylic acid of about 3:1;
    heating the admixture of said polyol and polycarboxylic acid to substantially esterify said polyol and said acid to thereby produce said water-thinnable ester, said ester being selected from the group consisting of monoester, diester, triester and mixture thereof;
    admixing and water-thinnable ester with (a) a water-thinnable ester with (a) a water-soluble, aminoplast resin in an amount sufficient to produce, upon curing in combination with said ester, a substantially water-insoluble, cured coating, and (b) a solvent for said ester and said aminoplast resin with water comprising at least a substantial portion of said solvent, to produce said heat-curable, resin solution.

2. The method of claim 1 wherein said water-thinnable ester has a maximum carbon/oxygen ratio of about 2.5:1.

3. The method of claim 1 wherein said heat-curable, resin solution is heated to react said ester with said aminoplast resin to produce said substantially water-insoluble coating.

4. The method of claim 1 wherein said polyol is selected from the group consisting of trimethylolpropane, trimethylolethane and trimetholbutane.

5. The method of claim 4 wherein said polycarboxylic acid is selected from the group consisting of: orthophthalic acid; isophthalic acid; tetrahydrophthalic acid; terephthalic acid; hexahydrophthalic acid; endomethylene tetrahydrophthalic acid; malonic acid; succinic acid; glutaric acid; adipic acid; suberic acid; azelaic acid; trimethyl adipic acid; sebacic acid; and anhydrides thereof.

6. The method of claim 1 wherein said aminoplast resin is present in amount between about 25% and about 75% by weight of the total weight of said ester and aminoplast resin.

7. The method of claim 1 wherein said solution contains a catalytic amount of a catalyst for said ester aminoplast resin reaction.

8. The method of claim 7 wherein said solution is heated to a temperature up to about 350° F. for about 1-2 minutes to obtain said coating.

9. The heat-curable solution of claim 1.

10. The cured composition of claim 9.

11. The method of claim 1 wherein said heating of said admixture is continued until a solids acid number below about 10 is obtained.

12. A method of making a heat-curable, aqueous resin solution incorporating of water-thinnable ester therein for use in making a water-insoluble coating, said method consisting of the steps of:
    admixing a triol having a carbon-oxygen ratio between about 5:3 and about 7:3 with a polycarboxylic acid having from 3 to about 10 carbon atoms and having 2-4 carboxyl groups in an equivalents ratio of said triol to said polycarboxylic acid of about 3:1, said polycarboxylic acid being selected with respect to said triol to produce a water-thinnable ester having a maximum carbon/oxygen ratio of about 2.5:1, said ester being selected from the group consisting of monester, diester, triester, and mixtures thereof;
    heating the admixture of said triol and said polycarboxylic acid to substantially esterify said thiol and said acid to produce said water-thinnable ester;
    admixing said water-thinnable ester with (a) a water-soluble aminoplast resin in an amount sufficient to produce, in combination with said ester, a substantially water-insoluble cured coating and (b) a solvent for said ester and said aminoplast resin with said comprising a major portion of said solvent, to thereby produce said heat-curable resin solution.

13. The method of claim 12 wherein said heating is continued until the acid number of said ester is below about 10.

14. The method of claim 12 wherein said aminoplast resin is present in an amount between about 25% and about 75% by weight of the total weight of said ester and aminoplast resin.

15. The method of claim 12 wherein said solution is heated to cure said resin solution to obtain said coating.

16. The method of claim 15 wherein said solution is heated to a temperature up to about 350° F. for about 1 to 2 minutes to obtain said coating.

* * * * *